US008577586B2

(12) United States Patent
Niki et al.

(10) Patent No.: US 8,577,586 B2
(45) Date of Patent: Nov. 5, 2013

(54) TRAVEL CONTROL DEVICE

(75) Inventors: Keitaro Niki, Susono (JP); Mitsuhisa Shida, Susono (JP); Tomoyuki Doi, Gotenba (JP); Kunihito Sato, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1157 days.

(21) Appl. No.: 12/375,859

(22) PCT Filed: Aug. 6, 2007

(86) PCT No.: PCT/JP2007/065790

§ 371 (c)(1), (2), (4) Date: Jan. 30, 2009

(87) PCT Pub. No.: WO2008/018607

PCT Pub. Date: Feb. 14, 2008

(65) Prior Publication Data

US 2009/0271050 A1 Oct. 29, 2009

(30) Foreign Application Priority Data

Aug. 7, 2006 (JP) ................................ 2006-214772

(51) Int. Cl.
*G06F 19/00* (2011.01)

(52) U.S. Cl.
USPC ............ 701/118; 701/119; 701/465; 701/482

(58) Field of Classification Search
USPC ......... 701/117–119, 213–215, 1, 19, 20, 400, 701/465, 482, 120, 121; 340/933, 995.13, 340/988, 995.19
See application file for complete search history.

(56) References Cited

U.S. PATENT DOCUMENTS 7,912,627 B2 * 3/2011 Downs et al. ................. 701/117
2003/0182183 A1 9/2003 Pribe
2005/0222716 A1 10/2005 Tengler et al.

(Continued)

FOREIGN PATENT DOCUMENTS

EP 1 785 744 A1 5/2007
JP A-10-261195 9/1998

(Continued)

OTHER PUBLICATIONS

T. Yashiro et al., "Construction and Performance Evaluation of the Platoon-Formation Algorithm Considering the Destination of Each Vehicle", Intelligent Vehicles Symposium, 1996, Proceedings of the 1996 IEEE Tokyo, Japan, Sep. 19-20, 1996, New York, NY, USA, IEEE, US, Sep. 19, 1996, pp. 35-40, XP010209706.

May 2, 2012 Search Report issued in European Patent Application No. 07792433.0.

*Primary Examiner* — Ronnie Mancho
(74) *Attorney, Agent, or Firm* — Oliff & Berridge, PLC

(57) ABSTRACT

Information for generating a target speed pattern is computed from information acquired from various sensors and a running mode input switch, so as to generate the target speed pattern (S16). A process for determining whether to form a vehicle group or not calculates the difference between the target vehicle pattern of the own vehicle and a target speed pattern of another vehicle or vehicle group obtained through inter-vehicle communication, so as to determine whether to form the vehicle group or not (S22, S28, S32). This can determine whether to run solo or form a vehicle group according to a driver's demand.

5 Claims, 9 Drawing Sheets

(56) References Cited

U.S. PATENT DOCUMENTS

| | | | | |
|---|---|---|---|---|
| 2007/0100537 | A1 * | 5/2007 | Parikh et al. | 701/117 |
| 2007/0208495 | A1 * | 9/2007 | Chapman et al. | 701/117 |
| 2007/0208498 | A1 * | 9/2007 | Barker et al. | 701/117 |
| 2007/0208501 | A1 * | 9/2007 | Downs et al. | 701/119 |

FOREIGN PATENT DOCUMENTS

| | | |
|---|---|---|
| JP | A-11-039592 | 2/1999 |
| JP | A-2003-115095 | 4/2003 |
| JP | A-2004-294068 | 10/2004 |
| JP | A-2006-010639 | 1/2006 |

* cited by examiner

*Fig.5*

| Group name | A | B | C | D | E | F | ····· |
|---|---|---|---|---|---|---|---|
| Required time range | $0 \sim T_1$ | $T_1 \sim T_2$ | $T_2 \sim T_3$ | $T_3 \sim T_4$ | $T_4 \sim T_5$ | $T_5 \sim T_6$ | ····· |
| | $N(A_1)$ | $N(B_1)$ | $N(C_1)$ | $N(D_1)$ | $N(E_1)$ | $N(F_1)$ | ····· |
| | $N(A_2)$ | $N(B_2)$ | $N(C_2)$ | $N(D_2)$ | $N(E_2)$ | $N(F_2)$ | ····· |
| Vehicle group formation | $N(A_3)$ | $N(B_3)$ | $N(C_3)$ | $N(D_3)$ | $N(E_3)$ | $N(F_3)$ | ····· |
| | ····· | ····· | ····· | ····· | ····· | ····· | ····· |
| | $N(A_n)$ | $N(B_n)$ | $N(C_n)$ | $N(D_n)$ | $N(E_n)$ | $N(F_n)$ | ····· |

$T_n$: time required for running distance L $N(*n)$: ID number of each vehicle

TRAVEL CONTROL DEVICE

TECHNICAL FIELD

The present invention relates to a running control apparatus.

BACKGROUND ART

An idea has conventionally been proposed in which vehicles running on a road and the like form a group such as to construct an array also known as platoon. Running in a group is expected to be effective in improving mileage and traffic flow efficiency, alleviating driving load, increasing moving speed, and so forth. Known as an apparatus for forming such a vehicle group is one computing a degree of similarity between vehicle information of a vehicle and vehicle information of another vehicle or vehicle group and forming a group with a vehicle or vehicle group whose similarity is at a set value or greater (see, for example, Japanese Patent Application Laid-Open No. 10-261195). This apparatus uses destinations, vehicle position information, engine output, torque characteristics, acceleration performances, brake characteristics, and the like as vehicle information to be compared between the vehicles.

DISCLOSURE OF THE INVENTION

However, the prior art aims at smoothly forming a vehicle group and thus cannot allow the vehicle to run in response to a running mode required by the driver. For example, the prior art forms a vehicle group even when it is desirable to reach a destination as soon as possible, whereby the vehicle does not always arrive at the destination sooner. It is also difficult for the prior art to improve the average mileage and average speed of the vehicle group.

For solving such a technical problem, it is an object of the present invention to provide a running control apparatus which reflects a running mode required by the driver into running control.

Namely, the running control apparatus in accordance with the present invention is a running control apparatus for forming a vehicle group constituted by a plurality of vehicles, the apparatus including vehicle group forming unit for determining whether or not to form a vehicle group constituted by a plurality of vehicles by comparing respective action plans of vehicles to a predetermined point.

The present invention can determine whether or not to form a vehicle group by comparing action plans of a plurality of vehicles to a predetermined point, so as to allow a vehicle to run in consideration of the running mode required by the driver, thereby making it possible to determine whether to run solo or form a vehicle group as required by the driver.

Preferably, the vehicle group forming unit may compare an action plan of a first vehicle to the predetermined point with an action plan of a second vehicle or vehicle group to the predetermined point, so as to determine whether or not to form a vehicle group constituted by the first vehicle and the second vehicle or the first vehicle and vehicle group.

Such a configuration makes it possible to compare respective action plans of two vehicles to the predetermined point with each other, so as to determine whether or not to form a vehicle group.

Preferably, in the vehicle group forming unit, the action plan may be a temporal change of a target position. When the temporal change of the target position is taken into consideration, whether or not to form a vehicle group can be determined without losing the respective action plans of the vehicles.

Preferably, in the running control apparatus, the vehicle group forming unit may use a target route as the temporal change of the target position. Preferably, in the running control apparatus, the vehicle group forming unit may use a target speed pattern as the temporal change of the target position.

Such a configuration allows a vehicle to run solo or in a group without losing the action plan of the vehicle to the predetermined point as required by the driver.

Preferably, in the running control apparatus, the vehicle group forming unit may set a permissible range for the action plan of the first vehicle to the predetermined point and forts a vehicle group constituted by the first vehicle and the second vehicle or the first vehicle and vehicle group, wherein the second vehicle and vehicle group have an action plan to the predetermined point falling within the permissible range of the first vehicle.

Such a configuration can form a new vehicle group constituted by vehicles or vehicle groups whose running modes required by drivers are similar to each other within a permissible range, thereby making it possible to form a vehicle group flexibly without losing drivers' demands.

The running control apparatus may include action plan generating unit for generating the action plan according to a running mode required by a driver.

By reflecting a running mode required by the driver into an action plan, e.g., target speed pattern or target route, in at least the driver's own vehicle, such a configuration allows this vehicle to run so as to satisfy the running mode required by the driver.

Preferably, in the running control apparatus, the target speed pattern may be constituted by a time required for each vehicle or vehicle group to run a given distance section.

Such a configuration makes it possible to form a vehicle group while using a required time as a parameter, and thus can make the traffic flow more efficient and improve the average speed of the vehicle group.

The vehicle group forming system in accordance with the present invention is a vehicle group forming system for forming a vehicle group with a plurality of vehicles, the system forming the vehicle group by comparing respective action plans of vehicles or vehicle groups to a predetermined point.

Such a configuration makes it possible to form a vehicle group by using an action plan to a predetermined point, e.g., target speed pattern or target route, so that the vehicle group can be formed such as to reduce the average required time in a plurality of vehicle groups, which can make the traffic flow more efficient and improve the average mileage and average speed in the plurality of vehicle groups.

BRIEF DESCRIPTION OF THE DRAWINGS

FIG. 5 is an explanatory view of a vehicle group forming method;

BEST MODES FOR CARRYING OUT THE INVENTION

In the following, embodiments of the present invention will be explained with reference to the accompanying drawings. In the explanation of the drawings, the same constituents will be referred to with the same numerals or letters while omitting their overlapping descriptions.

First Embodiment

Figure 1:
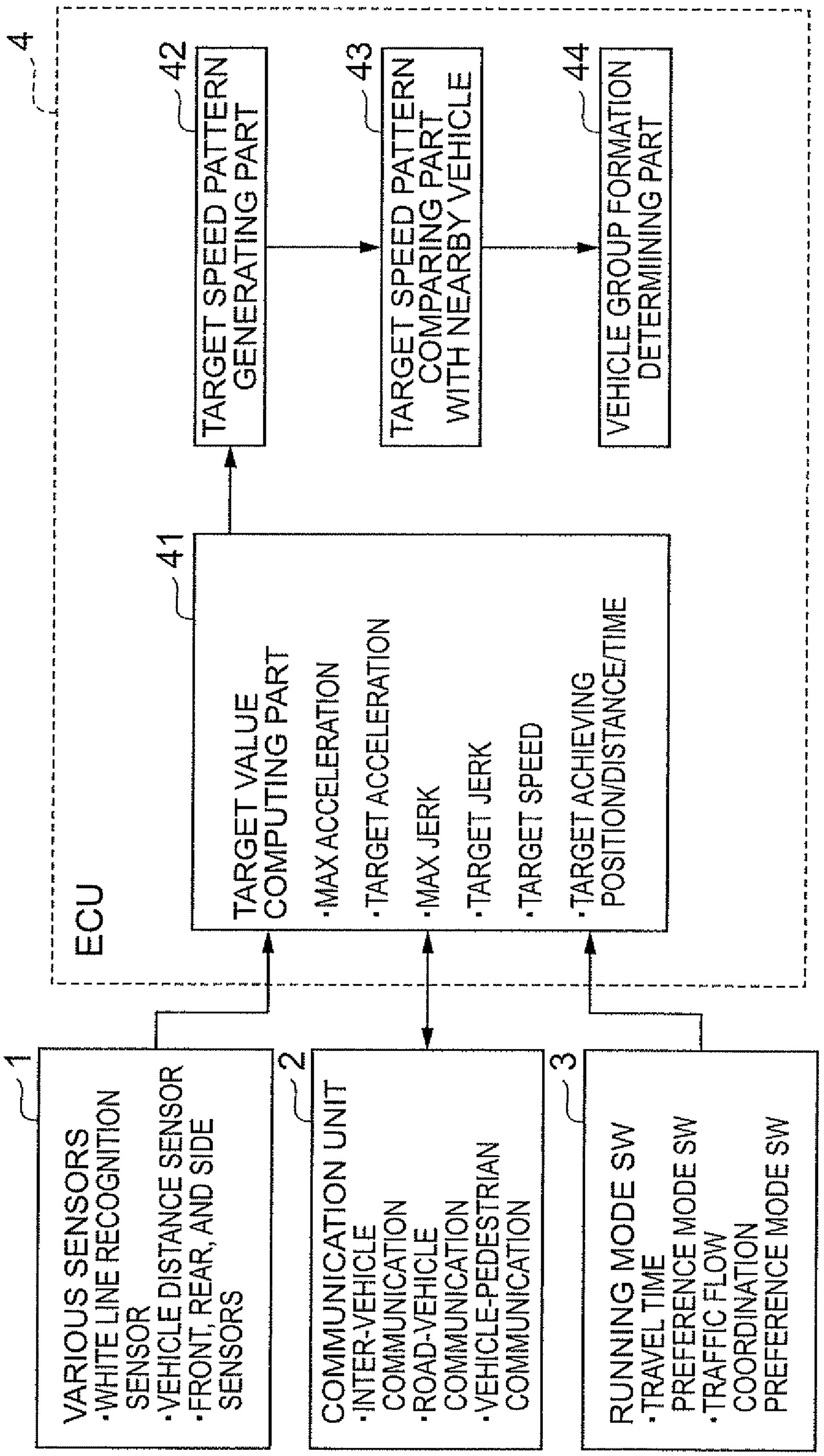
FIG. 1 is a block diagram showing an outline of the structure of the running control apparatus in accordance with a first embodiment.

FIG. 1 is a schematic view showing a hardware structure of the running control apparatus in accordance with the first embodiment of the present invention. The running control apparatus in accordance with this embodiment comprises various sensors 1, a communication unit 2, a running mode input switch 3, and an ECU 4. Here, the ECU (Electronic Control Unit) is a computer for automobile devices to be electronically controlled, which comprises a CPU (Central Processing Unit), a ROM (Read Only Memory), a RAM (Random Access Memory), I/O interfaces, and the like.

The various sensors 1 include a white line recognition sensor for recognizing white lines painted on roads, a vehicle distance sensor for measuring the distance between the own vehicle and another vehicle, and front, rear, and side sensors for recognizing objects in front and rear and on the sides of the own vehicle and have functions of inputting information required for automatic running. For example, the white line recognition sensor is equipped with an on-board CCD camera which can recognize images, while the vehicle distance sensor and front, rear, and side sensors are provided with devices for inputting/outputting ultrasonic waves and lasers.

The communication unit 2 has an inter-vehicle communication function for communication between vehicles, a road-vehicle communication function for communicating with management terminals on roads, a vehicle-pedestrian communication for communication between a communication unit held by a pedestrian and the vehicle, and the like, which is a part for exchanging information necessary for automatic running with various objects. For example, it is a communication device equipped with an antenna, signal transmitting/receiving parts, a signal control part, and the like.

The running mode input switch 3 is a switch for a driver to decide a way of running. For example, it has a structure which can select between a travel time preference mode and a traffic flow coordination preference mode. The driver operates the switch, so as to determine whether to prefer time or mileage. The above-mentioned structure is not necessarily realized by hardware, but can be embodied, for example, by a logic in which a travel time preference flag area is prepared by software, and a flag of the travel time preference mode is changed from 0 to 1 when there is an input choosing the travel time preference mode. Preferably, the travel time preference mode allows an input of a tolerable delay time after the state of the switch is changed.

The ECU 4 comprises a target value computing part 41, a target speed pattern generating part (action plan generating unit) 42, a target speed pattern comparing part 43, and a vehicle group formation determining part (vehicle group forming unit) 44. The target value computing part 41 has a function of computing a value for controlling the running of the own vehicle at the time of automatic driving from input information obtained from the various sensors 1, communication unit 2, and running mode input switch 3. Specific examples of the control information include the maximum acceleration, target acceleration, maximum jerk, target jerk, target speed, and target speed achieving position/distance/time. The target speed pattern generating part 42 has a function of generating a target speed pattern in response to an input of the control information calculated by the target value computing part 41. The target speed pattern comparing part 43 has a function of comparing the target speed pattern generated by the target speed pattern generating part 42 and the target speed pattern of a nearby vehicle obtained from the communication unit 2 with each other. The vehicle group formation determining part 44 has a function of determining whether to run solo or form a group in response to an input of the result of comparison computed by the target speed pattern comparing part 43. The functions realized within the ECU 4 are not necessarily embodied by hardware, but can be fulfilled by software as well.

Operations of the running control apparatus in accordance with this embodiment will now be explained.

Figure 2:
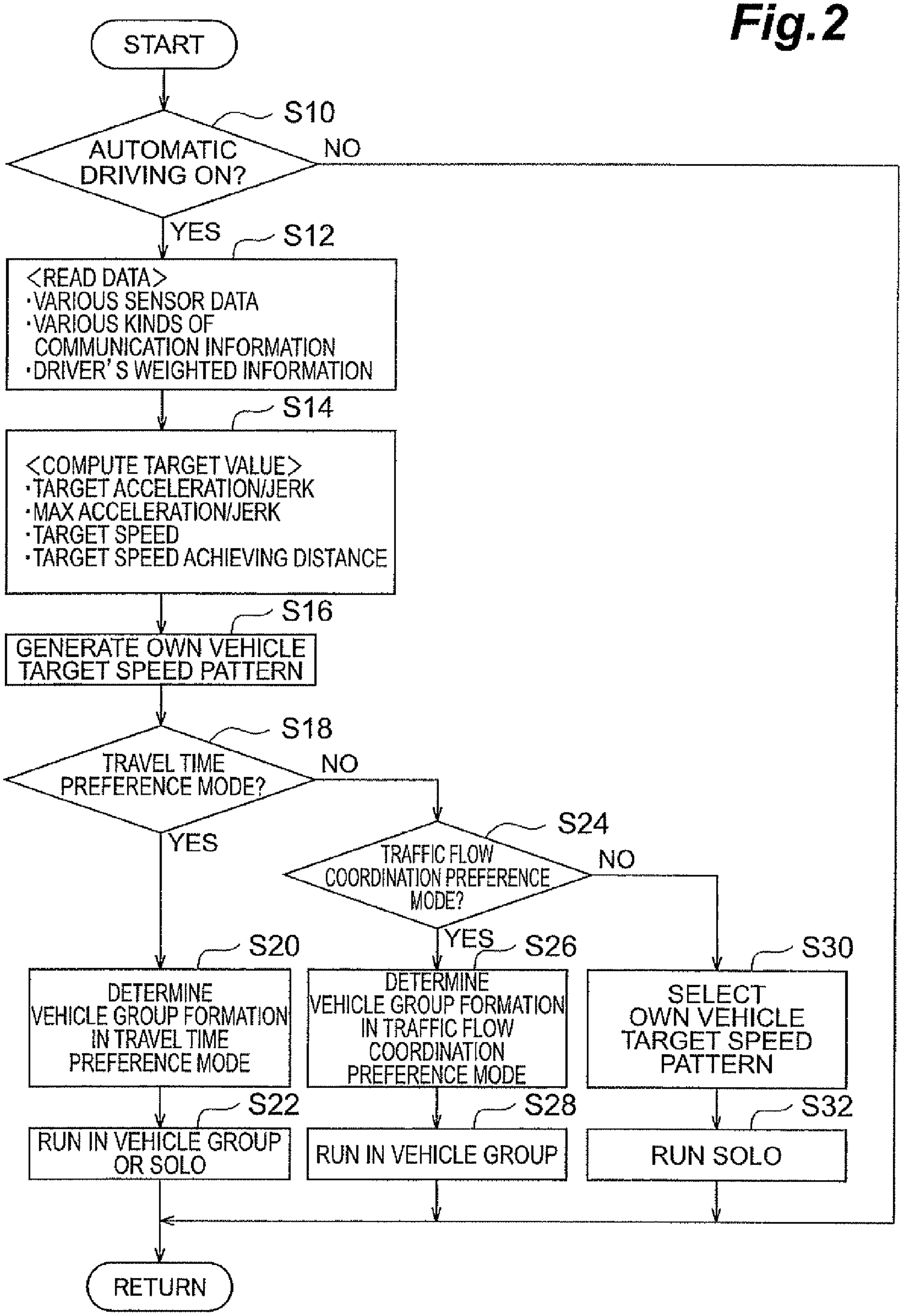
FIG. 2 is a flowchart showing operations of the running control apparatus of FIG. 1.

FIG. 2 is a flowchart showing operations of the running control apparatus in accordance with this embodiment. The control process shown in FIG. 2 is repeatedly executed at a predetermined timing after the power of a vehicle is turned on, for example. Alternatively, in synchronization with a rate at which information of another vehicle is acquired, the process may be performed for each vehicle or every several vehicles from which the information is acquired, for example.

When the control process shown in FIG. 2 is started, it is determined whether automatic driving is in effect or not (S10). The automatic driving refers to controlling the driving under a predetermined rule. For example, steering may be controlled along a lane while the various sensors 1 shown in FIG. 1 recognize a white line, or running is automatically controlled so as not to make the vehicle distance shorter than a recommended vehicle distance while receiving the recommended vehicle distance in conformity with the weather by the communication unit 2 shown in FIG. 1. It is sufficient for the processing at S10 to refer to an automatic driving effect flag, which is changed from 0 to 1 at the time of automatic driving, for example. At least automatic driving is necessary for automatically controlling vehicle group formation. Therefore, the control process shown in FIG. 2 is terminated when no automatic driving is in effect.

When it is determined in the process at S10 that the automatic driving is in effect, e.g., when the automatic driving effect flag is 1, the flow shifts to a data reading process (S12). The data reading process is a process for reading data from the various sensors, various kinds of communication information, driver's weighted information, and the like.

The information from the various sensors is mainly one directly available from items located very close to the own vehicle. Its examples include information concerning a lane of the road on which the vehicle runs and information about positions of other vehicles located in front and rear and on the sides of the own vehicle.

The various kinds of communication information are information about other vehicles near the own vehicle and information concerning traffic situations. Their examples include target speed patterns of other vehicles and the number of vehicles in a given section.

The driver's weighted information is information concerning a way of running intended by the driver. For example, it is information about whether the travel time preference mode switch is ON or not in the case where the driver wishes to arrive at a destination while giving high priority to the arrival time. It is information about whether the traffic flow coordination preference mode switch is ON or not. This information is whether the travel time preference mode flag is 0 or 1, for example, when the functions are realized by software. When a tolerable delay time of the driver is inputted, this information is also included in the driver's weighted information.

When the process at S12 ends, the flow shifts to a target value computing process (S14). The target value computing process is a process for computing information for generating a target speed pattern of the own vehicle from the information obtained by the process at S12. Examples of the information required for generating the target speed pattern include an acceleration or jerk (derivative of acceleration) to become a target, the maximum acceleration or maximum jerk to become a target, a target speed, and a target speed achieving distance. Such information is generated from the driver's weighted information (information about the selected running mode), characteristic information concerning running performances of the own vehicle (e.g., engine output, torque characteristics, acceleration performances, and brake characteristics), topographic information, and the like. When the selected running mode is the travel time preference mode, for example, the target acceleration, target jerk, target speed, and target speed achieving distance are selected so as to make the arrival time as short as possible within a range permissible in terms of performances and running environment.

When the process at S14 ends, the flow shifts to a process for generating a target speed pattern (S16). The target speed pattern is a speed value dependent on distance or time, which is calculated from information such as the acceleration or jerk (derivative of acceleration) to become a target, maximum acceleration or maximum jerk to become a target, target speed, and target speed achieving distance. The target speed pattern may also be a distance dependent on time. When integrated, the speed value dependent on time becomes a distance dependent on time, whereby they are equivalent to each other.

When the process at S16 ends, the flow shifts to a selection process for determining whether the travel time preference mode is in effect or not (S18). Information about whether the travel time preference mode is in effect or not is included in the driver's weighted information inputted in the process at S12.

When the travel time preference mode is in effect in the process at S18, the flow shifts to a vehicle group formation determining process (S20). The vehicle group formation determining process computes the difference between the target speed pattern of the own vehicle and the target speed pattern of another vehicle or vehicle group obtained by the process at S12.

Considered as examples of computing the target vehicle speed pattern difference are a case where times required for running a given section are calculated from the respective target speed patterns and compared with each other and a case where they are calculated from respective root mean squares of the target speed patterns and compared with each other. Examples and comparative examples of calculating the difference will later be explained in detail. From the result of comparison, it is determined whether to form a vehicle group or run solo (S22), whereby the process ends. Examples of forming a vehicle group will later be explained in detail.

When the travel time preference mode is not in effect in the process at S18, the flow shifts to a selection process for determining whether the traffic flow coordination preference mode is in effect or not (S24).

When the traffic flow coordination mode is in effect in the process at S24, it is determined what vehicle group is to be formed (S26), and the vehicle runs in a group (S28). When the traffic flow coordination preference mode is not in effect, the own vehicle target speed pattern is assumed to have been selected (S30), whereby the vehicle runs solo (S32).

Executing the processes of S18 and S24 enables running in consideration of the running mode required by the driver, whereby it can be determined whether to run solo or form a vehicle group.

Two sets of examples and comparative examples of computing the target speed pattern difference in accordance with this embodiment will now be explained.

Figure 3:
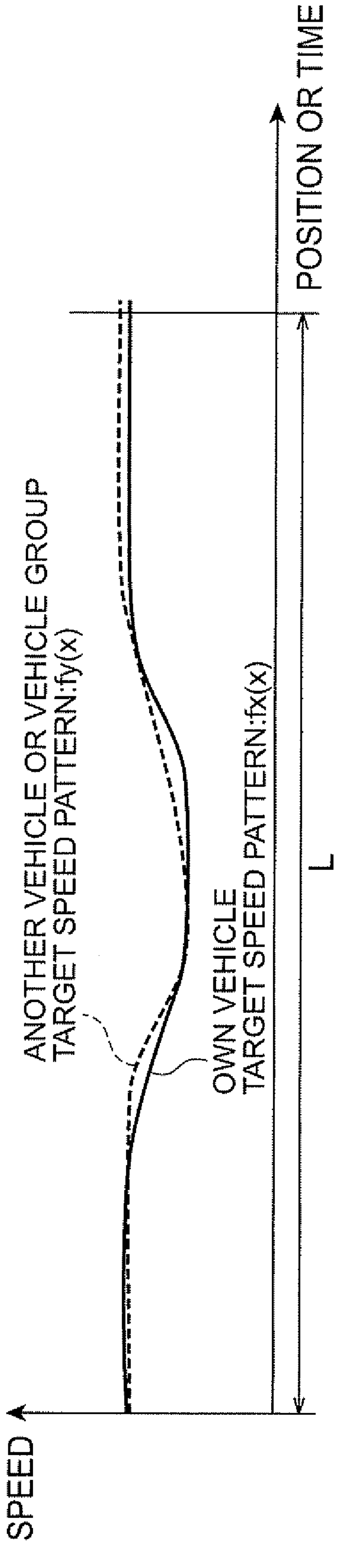
FIG. 3 shows target speed patterns of vehicles.

FIG. 3 shows an example of computing the target speed pattern difference in accordance with this embodiment and a comparative example. This graph indicates target speed patterns dependent on position or time. The solid line is a target speed pattern of the own vehicle, which is referred to as $f_x(x)$. The dotted line is a target speed pattern of another vehicle or vehicle group, which is referred to as $f_y(x)$. Let L be a given time or section. In this case, the root mean square of the difference between the areas of $f_x(x)$ and $f_y(x)$ is defined as the target speed pattern difference value and can be expressed as follows:

$$Rqf = \sqrt{\frac{1}{L}\int_0^L (fx(x) - fy(x))^2\,dx}$$

When thus obtained target speed pattern difference $R_{qf}$ is smaller than a given constant $\epsilon$ ($R_{qf}<\epsilon$), the vehicle forms a vehicle group with the other vehicle or vehicle group corresponding thereto. When the target speed pattern difference $R_{qf}$ is not smaller than the given constant $\epsilon$ ($R_{qf}\geq\epsilon$), the vehicle keeps running solo (S22 in FIG. 2). In this case, by reflecting the running mode required by the driver into the target speed pattern in at least the own vehicle, the own vehicle can run such as to satisfy the running mode required by the driver.

Another example of computing the difference and a comparative example will now be explained.

The time required for running a given section of L meters is calculated from the target speed pattern. For thus calculated time required, $T_m$, $T_n$, and $K_x$ seconds are assumed to be the time necessary for the own vehicle, the time necessary for the other vehicle or vehicle group, and the permissible delay time, respectively. When $T_n<T_m-K_x$, the difference from the other vehicle or vehicle group does not fall within the permissible range, whereby a vehicle group is formed with the corresponding other vehicle or vehicle group. When $T_n\geq T_m-K_x$, the difference falls within the permissible range, whereby the vehicle runs solo (S22 in FIG. 2). In this case, by reflecting the running mode required by the driver into the target speed pattern in at least the own vehicle, the own vehicle can run such as to satisfy the running mode required by the driver.

Operations of the vehicle group forming system in accordance with this embodiment will now be explained.

Figure 4:
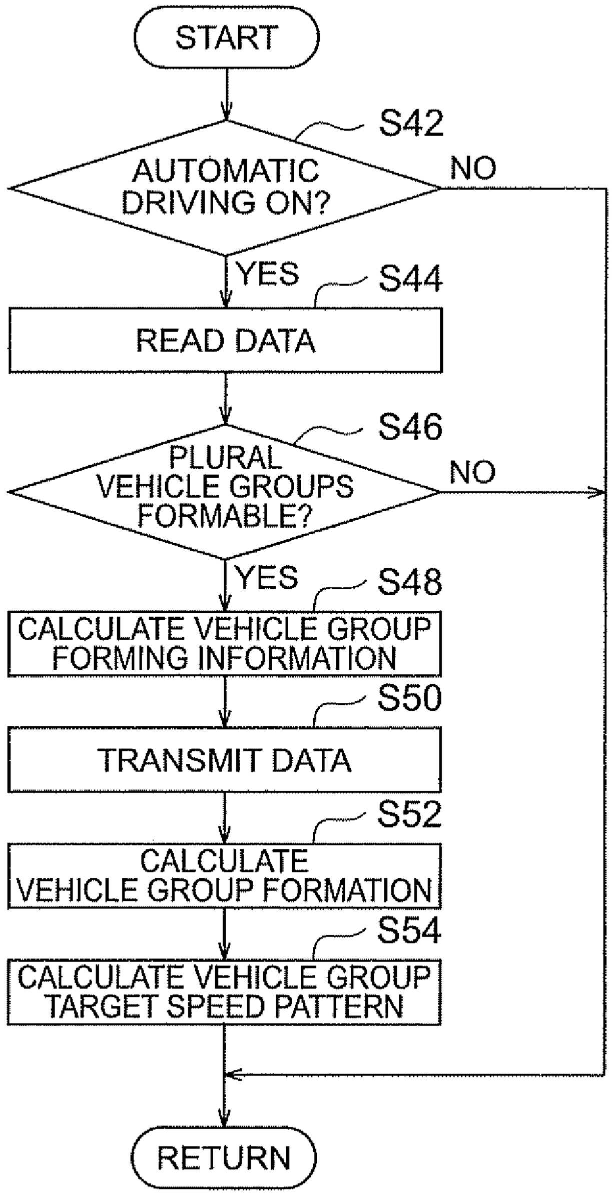
FIG. 4 is a flowchart showing operations of a vehicle group forming system.

FIG. 4 is a flowchart showing the operations of the vehicle group forming system in accordance with this embodiment. The control process shown in FIG. 4 is executed at the timing by which the vehicle group formation is determined in the processes of S22 and S28 shown in FIG. 2, for example.

When the control process shown in FIG. 4 is started, it is determined whether automatic driving is in effect or not (S42). The automatic driving refers to controlling the driving under a predetermined rule. It is sufficient for the processing at S42 to refer to an automatic driving effect flag, which is changed from 0 to 1 at the time of automatic driving, for example. At least automatic driving is necessary for automatically controlling vehicle group formation. Therefore, the control process is terminated when no automatic driving is in effect.

When it is determined in the process at S42 that the automatic driving is in effect, e.g., when the automatic driving effect flag is 1, the flow shifts to a data reading process (S44). The data reading process is a process for reading information such as the own vehicle target speed pattern computed in the process shown in FIG. 2, the required time for the other vehicle, the identification number for the other vehicle, and the number of other vehicles. The required time is a time necessary for running a given distance and can be determined from the target speed pattern. The identification number is a number allocated when forming a group for each required time. The number of vehicles is the number of vehicles having selected the traffic flow coordination preference mode which exist in a given section.

When the process at S44 ends, the flow shifts to a process of determining whether a plurality of vehicle groups can be formed or not (S46). It is sufficient for the process at S46 to determine whether N>M is satisfied or not, where M is the maximum number of vehicles forming a vehicle group, and N is the number of other vehicles, for example.

When N>M is not satisfied, a plurality of vehicle groups cannot be formed, whereby the control process is terminated.

When N>M is satisfied, the flow shifts to a data calculating process (S48). The process at S48 calculates the required time for the own vehicle from the target speed pattern of the own vehicle and forms a group for each required time.

When the process at S48 ends, the flow shifts to a data transmitting process (S50). Examples of the data transmitted in the process at S50 include information about which group one belongs to and the identification number of the own vehicle. This inter-vehicle communication allows the grouped information to become information shared by all the nearby vehicles.

When the process at S50 ends, the flow shifts to a vehicle group formation calculating process (S52). The process at S52 forms a vehicle group according to the identification number computed by the process at S50. The vehicle group formation will later be explained in detail.

When the process at S52 ends, the flow shifts to a vehicle group target speed pattern calculating process (S54). The process at S54 becomes a process of determining an average of target speed patterns of vehicles within a vehicle group, for example. Further, the target speed pattern of the vehicle having the shortest required time in each vehicle group can be taken as the target speed pattern of the vehicle group. In this case, the vehicle group is formed such as reduce its average required time, whereby the average speed can be improved. Here, a plurality of vehicle groups may be taken as a larger vehicle, so as to form a large vehicle group constituted by vehicle groups, thereby yielding an average value of the respective target speed patterns of the vehicle groups. In this case, the average mileage can be improved by forming a larger vehicle group.

The vehicle group forming system in accordance with this embodiment will now be explained in detail.

Let Grp(X) be a plurality of vehicle groups to be formed (where X is an integer). When there are three vehicle groups, they are referred to as Grp(1), Grp(2), and Grp(3), respectively.

The time required for running a predetermined distance of L meters can be determined from the target speed pattern and is defined as $T_n$ seconds (where n is an integer). The required times $T_n$ for the vehicles are determined and grouped at predetermined intervals of time. When the required times are grouped at intervals of 10 seconds, for example, groups A, B, and C have the required times of less than 10 seconds, at least 10 seconds but less than 20 seconds, and at least 20 seconds but less than 30 seconds, respectively. When a given vehicle has the required time of 15 seconds, this vehicle belongs to the group B.

When it is found which group the own vehicle belongs to, this information is transmitted to the other vehicles. This inter-vehicle communication makes all the nearby vehicles share the grouping information. After the information is transmitted, the own vehicle is numbered in order of arrival within the group, so that $N(*_n)$ is given as the identification number (where * is the name of the group, and n is the number in order of arrival). When it is found that the own vehicle belongs to group B, while two vehicles have already been in the group B, for example, the own vehicle is the third vehicle in order of arrival in the group B. Here, the own vehicle attains the identification number of $N(B_3)$. FIG. 5 is an example of table provided with identification numbers.

For forming vehicle groups such as to reduce differences among average required times in a plurality of vehicle groups in vehicles to which identification numbers have thus been allocated, it will be sufficient if each vehicle group is formed such as to include one vehicle each from the individual groups as follows:

$Grp1=(N(A_1), N(B_1), N(C_1), \ldots, N(*_1))$ $Grp2=(N(A_2), N(B_2), N(C_2), \ldots, N(*_2))$ $Grp2=(N(A_3), N(B_3), N(C_3), \ldots, N(*_3))$

...

$GrpX=(N(A_n), N(B_n), N(C_n), \ldots, N(*_n))$

The target speed pattern in each of the above-mentioned vehicle groups is the average value of the target speed patterns of the vehicles therein. In this case, the vehicle group can be formed while using the required time as a parameter, whereby the traffic flow efficiency and the average speed of the vehicle group can be improved more than in the case where the vehicle group is formed by vehicles whose speed ranges are close to each other.

As in the foregoing, by inputting the driver's weighted information, the running control apparatus in accordance with the first embodiment enables running in consideration of the running mode required by the driver, thereby making it possible to determine whether to run solo or form a vehicle group as required by the driver.

Since it is sufficient for the driver's weighted information to depend on the own vehicle, the running control apparatus in accordance with the first embodiment allows the own vehicle to run so as to satisfy the driver's required running mode by reflecting the driver's required running mode into the target speed pattern in at least the own vehicle.

The running control apparatus in accordance with the first embodiment can form a vehicle group by using the required time that is information based on the target vehicle pattern, and thus can set the average speed pattern of the vehicle group smaller, thereby making the traffic flow more efficient and improving the average speed of the vehicle group.

The running control apparatus in accordance with the first embodiment can form vehicle groups such as to reduce the average required time in a plurality of vehicle groups, and thus can make the traffic flow more efficient and improve the average mileage and average speed in the plurality of vehicle groups.

Second Embodiment

The running control apparatus and vehicle group forming system in accordance with the second embodiment of the present invention will now be explained.

The running control apparatus and vehicle group forming system in accordance with the second embodiment are constructed substantially the same as those in accordance with the first embodiment except that vehicle groups are formed in consideration of a route to run. In the following, differences from the first embodiment will mainly be explained.

Figure 6:
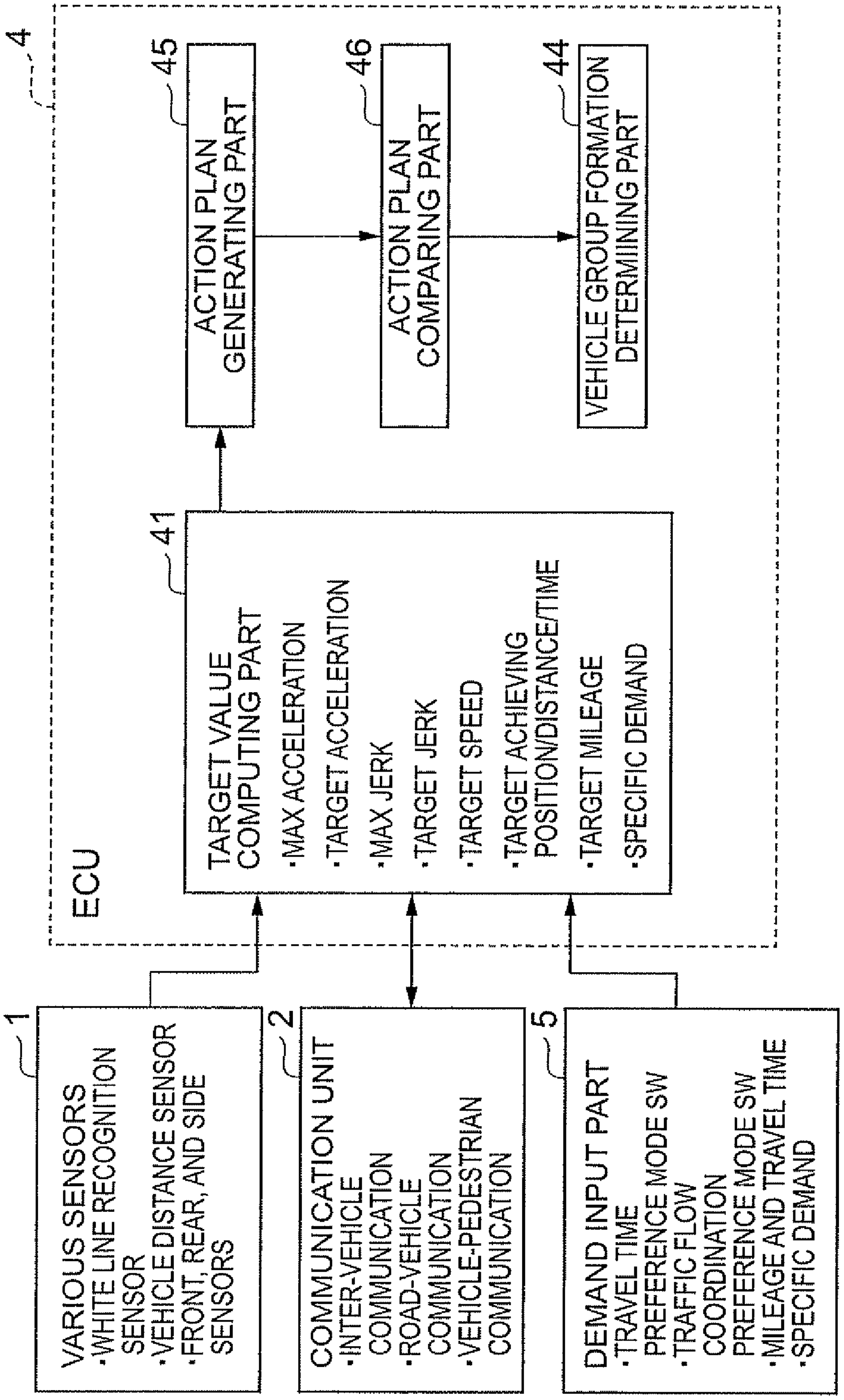
FIG. 6 is a block diagram showing an outline of the structure of the running control apparatus in accordance with a second embodiment.

FIG. 6 is a schematic view showing a hardware structure of the running control apparatus in accordance with the second embodiment. The running control apparatus in accordance with this embodiment is constructed substantially the same as that in accordance with the first embodiment except that the target speed pattern generating part 42, target speed pattern comparing part 43, and running mode input switch 3 in the first embodiment are replaced by an action plan generating part (action plan generating unit) 45, an action plan comparing part 46, and a demand input part 5, respectively.

The demand input part 5 has such a function that the driver can set in detail whether mileage or travel time is preferred in addition to the functions of the running mode input switch 3 in the first embodiment. For example, it has an interface by which the driver can input degrees of preference of mileage and travel time. This interface has such a function capable of selecting respective degrees of preference of mileage and travel time so as to allocate points, for example. Specifically, the interface is equipped with a memory in which the sum of the respective degrees of preference of mileage and travel time is 100% and has such a function that when the degree of preference of mileage is set to 30% by a button operation or the like, the remaining 70% is set as the degree of preference of travel time, for example, and when the degree of preference of mileage is set to 70%, the remaining 30% is set as the degree of preference of travel time, for example. The demand input part 5 also has a function capable of inputting individual demands of the driver, such as a demand for forming a vehicle group with a designated vehicle, for example. The demand input part 5 has a function of outputting the set demand information to the ECU 4 as well.

The action plan generating part 45 provided in the ECU 4 has a function of inputting information from the target value computing part 41 and generating an action plan to a predetermined point. The action plan is a plan such as speed information and arrival time, while the action plan to a predetermined point refers to information concerning how the vehicle runs to reach the predetermined point, e.g., destination. Namely, the action plan is a temporal change of a target position, examples of which include a target speed pattern and a target route. The target route is information about a route to run, The action plan generating part 45 generates a target running pattern and a target route according to the degrees of preference of mileage and travel time fed from the demand input part 5. The action plan generating part 45 also has a function of outputting thus generated action plan to the predetermined point to the action plan comparing part 46.

The action plan comparing part 46 has a function of comparing the action plan to the predetermined point generated by the action plan generating part 45 and an action plan of a nearby vehicle to the predetermined point obtained through the communication unit 2, for example, with each other and determining whether they are similar to each other or not. The action plan comparing part 46 also has a function of outputting the result of comparison to the vehicle group formation determining part 44.

Operations of the running control apparatus in accordance with this embodiment will now be explained.

Figure 7:
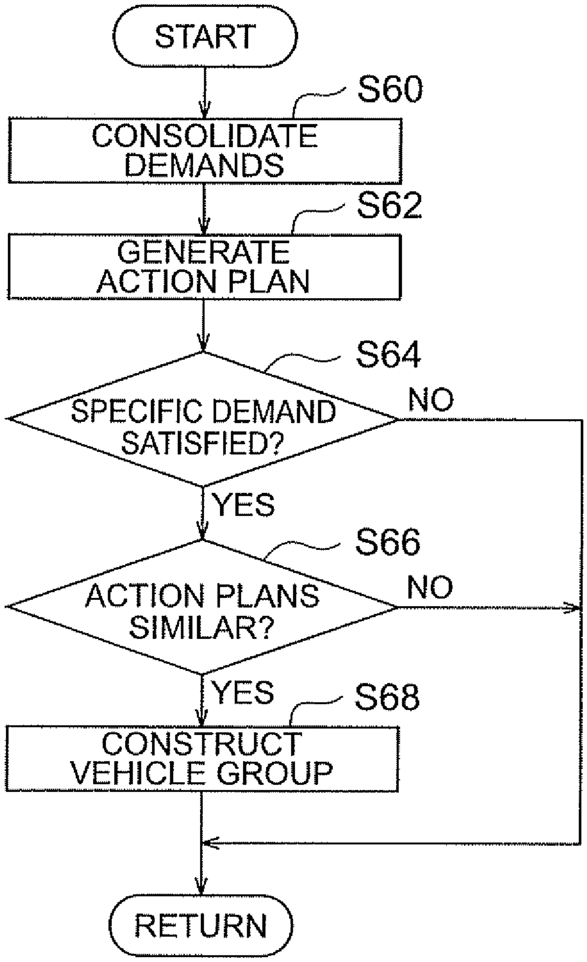
FIG. 7 is a flowchart showing operations of the running control apparatus of FIG. 6.

FIG. 7 is a flowchart showing operations of the running control apparatus in accordance with this embodiment. The control process shown in FIG. 7 is repeatedly executed at a predetermined timing after the power of a vehicle is turned on, for example. The process may also be started at a merging or branching point or when another vehicle merges into traffic through communication, for example. The vehicle to be controlled is supposed to be driven automatically.

The running control apparatus starts with a demand consolidating process shown in FIG. 7 (S60), The process at S60 is executed by the demand input part 5 and ECU 4, so as to input demands from the driver. For example, the process at S60 is a process of acquiring the allocation of the degrees of preference of mileage and travel time inputted through a predetermined interface such as input buttons by the driver. Specific demands such as a will to form a vehicle group with a specific vehicle, if inputted, are also acquired. After the process at S60 ends, the flow shifts to an active plan generating process (S62).

The process at S62 is executed by the action plan generating part 45, so as to generate an action plan to a predetermined point, for which a permissible range is set according to the information inputted in the process at S60. The procedure of generating the action plan to the predetermined point will now be explained in detail.

Figure 8:
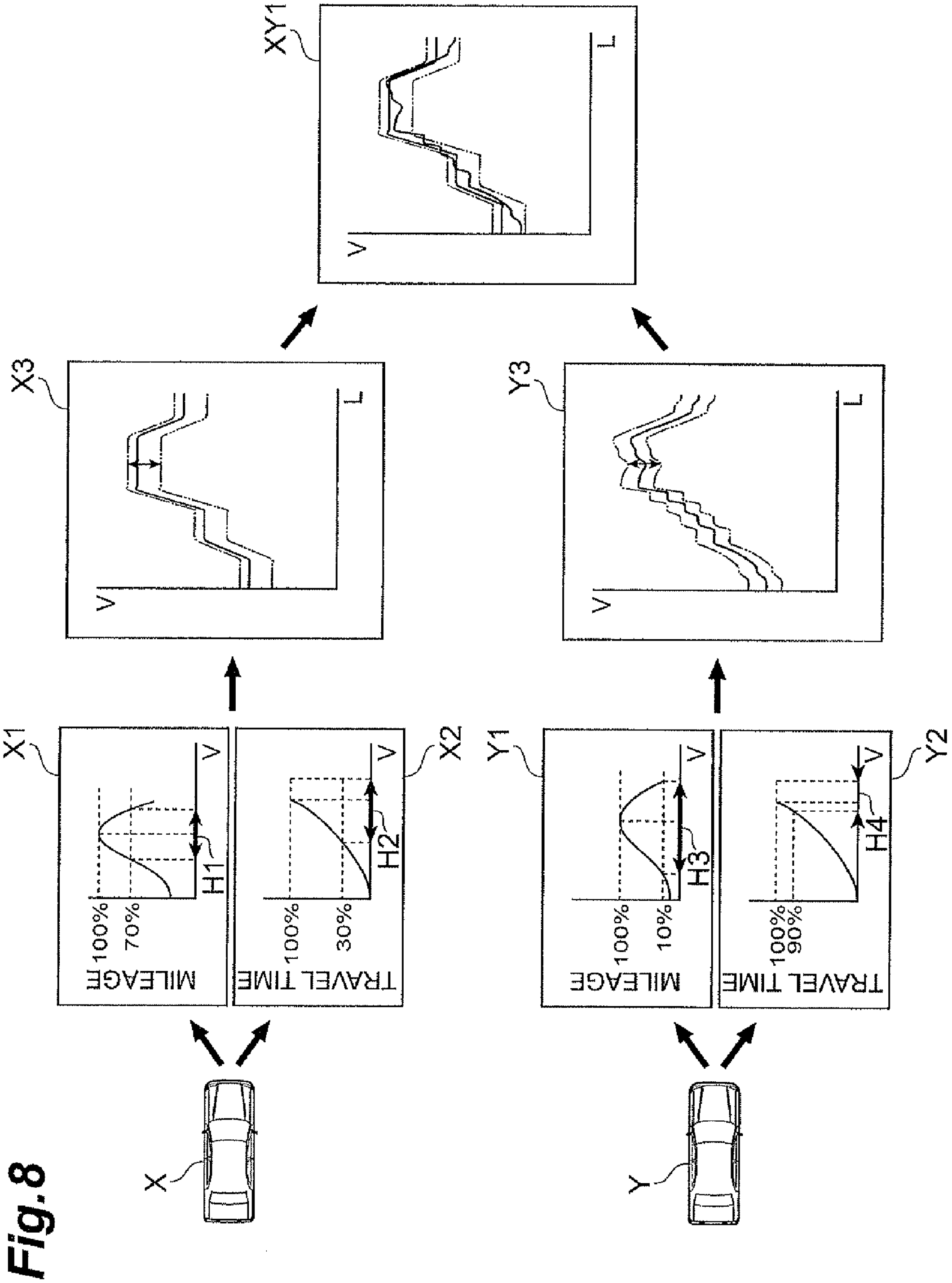
FIG. 8 is a schematic view showing a procedure of generating a target speed pattern.

First, the procedure of generating the target speed pattern will be explained with reference to FIG. 8. FIG. 8 is a schematic view showing the procedure of generating the target speed pattern. A case where information that a vehicle X runs at the mileage of 70% and travel time of 30% is inputted in the process at S60 will now be explained by way of example. The vehicle X determines a speed range H1 satisfying the mileage of 70% according to a graph X1 indicating a relationship between mileage and speed. The vehicle X also determines a speed range H2 satisfying the travel time of 30% according to a graph X2 indicating a relationship between travel time and speed. The graphs X1, X2 are set beforehand for each vehicle according to characteristic information of the vehicle and the like, for example. Using thus determined speed ranges H1, H2, a target speed pattern X3 of the vehicle X is set so as to satisfy the speed ranges H1, H2. The speed range thus set so as to satisfy the speed ranges H1, H2 becomes a permissible speed range, which can provide the target speed pattern X3 with a width. The foregoing procedure generates a target speed pattern for each vehicle. In the case where information that a vehicle Y runs at the mileage of 10% and travel time of 90% is inputted, for example, a speed range H3 satisfying the mileage of 10% is determined according to a graph Y1 indicating a relationship between mileage and speed, and a speed range 114 satisfying the travel time of 90% is determined according to a graph Y2 indicating a relationship between mileage and speed. A target speed pattern Y3 of the vehicle Y is set so as to satisfy thus determined speed ranges 113, 114.

Figure 9:
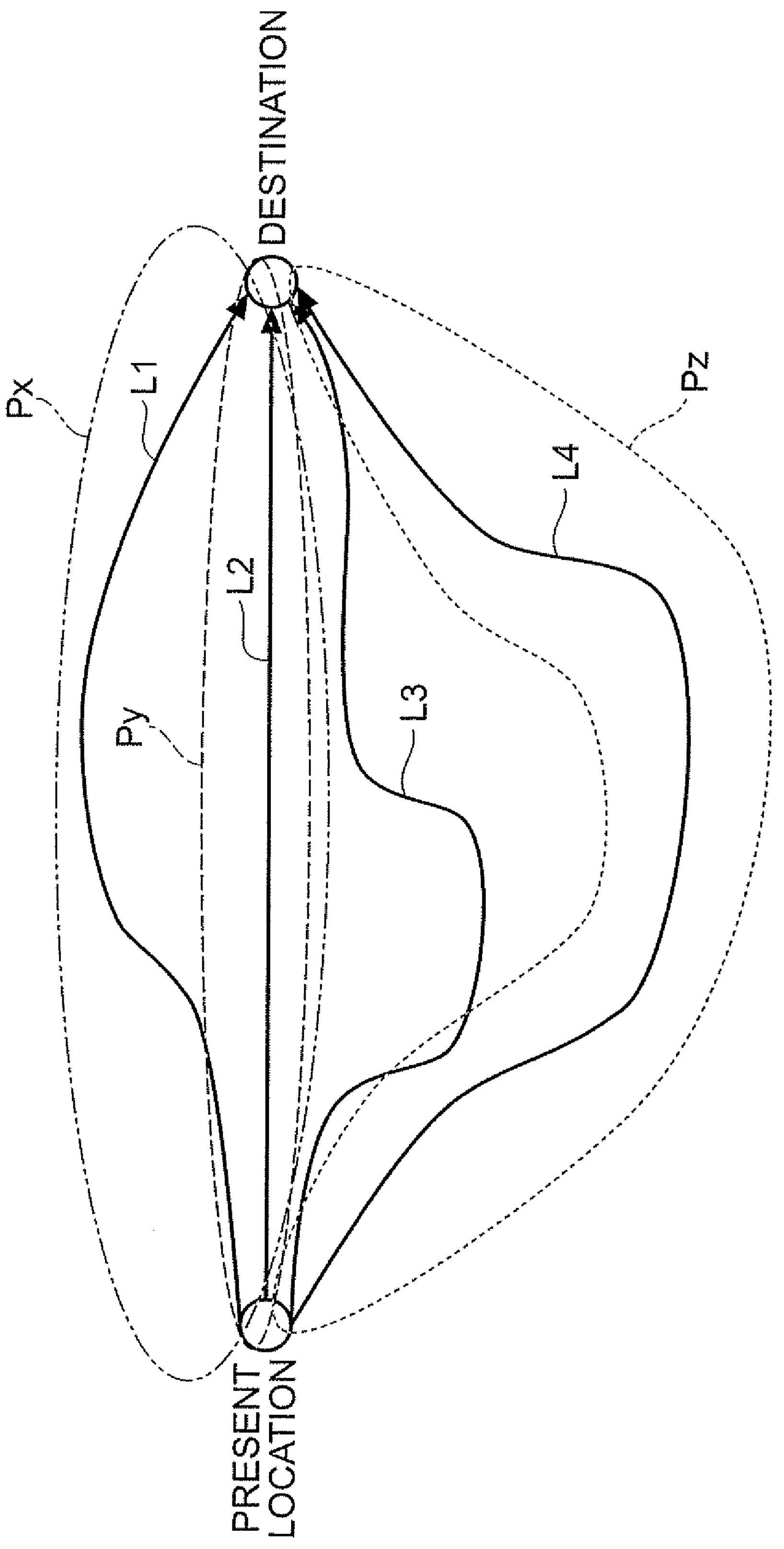
FIG. 9 is a schematic view showing target routes.

The procedure of generating the target route will now be explained with reference to FIG. 9. FIG. 9 is a schematic view showing target routes, in which target routes connecting a present location to a destination are indicated by L1 to L4. The target route L1 is the target route in the case of running at the mileage of 100% and travel time of 0%, while the target route L2 is the target route in the case of running at the mileage of 0% and travel time of 100%. The target routes L3, L4 represent examples of other cases.

First, as a procedure of generating a target route of each vehicle, a route range in which the permissible speed range can be acquired is selected according to the permissible speed range determined at the time of setting the target speed pattern and map information inputted. For example, the vehicle X selects a route range which can realize a speed region satisfying the speed ranges H1, H2 from the map information. Thus selected route range is a route range of $P_x$ shown in FIG.

9, whereby this route range becomes a target route $P_x$ including the permissible range. The foregoing procedure generates the target route for each vehicle. For example, as a route range which can realize a speed region satisfying the speed ranges H3, H4, the vehicle Y selects a route range of $P_y$ shown in FIG. 9 and employs it as a target route $P_y$ A vehicle Z, which is supposed to reach the destination after passing a predetermined point, selects a route range of $P_z$ shown in FIG. 9 as a route range which can realize a speed region satisfying the speed range and employs it as a target route $P_z$.

The processes of generating the target speed pattern and route range may be executed in each vehicle, or data may be transmitted to an apparatus or the like arranged on the outside of the vehicles so that they are subjected to arithmetic operations there and their results are received. After the process at S62 ends, the flow shifts to a specific demand verifying process (S64).

The process at S64 is executed at the vehicle group formation determining part 44, so as to determine whether or not a specific demand for the vehicle can be satisfied even when a vehicle group is formed. The specific demand is the driver's intention inputted from the demand input part 5. Examples of the specific demand include an unwillingness to form a vehicle group with trucks and the like, an intention to run such that a plurality of vehicles of friends moving in a group do not depart from each other, and a will to pass a predetermined point on the way to the destination. When there is such a specific demand, it is determined whether or not a vehicle group can be formed while satisfying the specific demand. In the case where it is determined in the process at S64 that the specific demand is not satisfied when the vehicle group is formed, the control process shown in FIG. 7 is terminated. In the case where it is determined in the process at S64 that the specific demand is satisfied even when the vehicle group is formed, on the other hand, the flow shifts to a comparing process (S66).

The process at S66 is executed by the action plan comparing part 46, so as to compare an action plan of another vehicle to a predetermined point and the action plan of the own vehicle to the predetermined point and determine whether they are similar to each other or not, in order to form a vehicle group constituted by vehicles whose action plans to the predetermined point are similar to each other. When comparing target speed patterns, as the action plans to the predetermined point, with each other, for example, it is determined whether or not the respective speed permissible ranges of target speed patterns overlap each other, whereby their similarity is judged. For example, as shown in FIG. 8, in order to determine whether or not the vehicles X and Y can form a vehicle group, it is determined whether or not the target speed pattern X3 of the vehicle X and the target speed pattern Y3 of the vehicle Y overlap and are similar to each other. When comparing the target routes, as the action plans to the predetermined point, with each other, it is determined whether or not the target routes overlap and are similar to each other. For example, as shown in FIG. 9, it is determined whether or not the target route $P_x$ of the vehicle X and the target route $P_y$ of the vehicle Y overlap each other. Similarly, each vehicle is subjected to the comparing process. For example, it is determined whether or not the target route $P_x$ of the vehicle X and the target route $P_z$ of the vehicle Z overlap each other, and whether or not the target route $P_y$ of the vehicle Y and the target route $P_z$ of the vehicle Z overlap each other. When there are no vehicles whose action plans to the predetermined point are similar to each other, it is determined better not to form a vehicle group, whereby the control process in FIG. 7 is terminated. When it is determined in the process at S66 that there are vehicles whose action plans to the predetermined point are similar to each other, the flow shifts to a vehicle group constructing process (S68).

The process at S68 is executed by the vehicle group formation determining part 44, so as to form a vehicle group constituted by the vehicles whose action plans to the predetermined point are determined similar to each other in the process at S66. For example, the target speed pattern X3 of the vehicle X partly overlaps the target speed pattern Y3 of the vehicle Y as shown in FIG. 8, while the target route Px of the vehicle X partly overlaps the target route Py of the vehicle Y as shown in FIG. 9. Therefore, the driver's demands can be satisfied even when the vehicles X and Y form a vehicle group. On the other hand, as shown in FIG. 9, the target routes Px, Py of the vehicles X, Y and the target route Pz of the vehicle Z do not overlap each other, whereby they do not form a vehicle group. After the process at S68 ends, the control process shown in FIG. 7 ends.

Executing the control process shown in FIG. 7 can reflect the driver's demand into the vehicle group formation, thereby making it possible to realize the running required by the driver. Since a vehicle group can be formed with vehicles falling within the permissible range determined from the set value, vehicles whose demands differ from each other can form the vehicle group. Using the target routes shown in FIG. 9, the above can be employed in the running control system of the second embodiment performing a process similar to that of the first embodiment.

As in the foregoing, the running control apparatus in accordance with the second embodiment can determine whether to form a vehicle group or not by comparing action plans of vehicles to a predetermined point, so as to allow a vehicle to run in consideration of the running mode required by the driver, thereby making it possible to determine whether to run solo or form a vehicle group as required by the driver.

The running control apparatus in accordance with the second embodiment can form a new vehicle group constituted by vehicles or vehicle groups whose running modes required by drivers are similar to each other within a permissible range, thereby making it possible to form a vehicle group flexibly without losing drivers' demands.

The running control apparatus in accordance with the second embodiment allows a vehicle to run solo or in a group without losing the action plan of the vehicle to the predetermined point as required by the driver.

By reflecting a running mode required by the driver into an action plan, e.g., target speed pattern or target route, in at least the driver's own vehicle, the running control apparatus in accordance with the second embodiment allows this vehicle to run so as to satisfy the running mode required by the driver.

The running control apparatus in accordance with the second embodiment makes it possible to form a vehicle group by using an action plan to a predetermined point, e.g., target speed pattern or target route, so that the vehicle group can be formed such as to reduce the average required time in a plurality of vehicle groups, which can make the traffic flow more efficient and improve the average mileage and average speed in the plurality of vehicle groups.

The above-mentioned embodiments show only examples of the running control apparatus and vehicle group forming system in accordance with the present invention. The running control apparatus and vehicle group forming system in accordance with the present invention are not limited to those in accordance with the embodiments, but may be those in which the running control apparatus and vehicle group forming system in accordance with the embodiments are modified or applied to others within the scope not altering the gist defined in each claim.

For example, while the above-mentioned second embodiment explains the case where action plans to the predetermined point in two vehicles are compared with each other, so as to determine whether to form a vehicle group or not, in order to form the vehicle group, the number of vehicles whose action plans to the predetermined point are compared with each other is not limited to two, whereby plans of three or more vehicles to the predetermined point may be compared with each other at the same time, so as to determine the vehicle group formation.

INDUSTRIAL APPLICABILITY

The present invention allows a vehicle to run in response to a running mode required by the driver.

The invention claimed is:

1. A running control apparatus for forming a vehicle group constituted by a plurality of vehicles, the apparatus comprising:

an action plan generating unit for generating a target speed pattern according to a running mode required by a driver, the running mode being selected from a travel time preference mode and a traffic flow coordination preference mode;

a vehicle group forming unit for determining whether or not to form the vehicle group constituted by the plurality of vehicles by comparing respective target speed patterns of vehicles to a predetermined point; and a determining unit that determines whether or not a specific demand for the vehicle can be satisfied even when the vehicle group is formed.

2. A running control apparatus according to claim 1, wherein the vehicle group forming unit compares a target speed pattern of a first vehicle to the predetermined point with a target speed pattern of a second vehicle or vehicle group to the predetermined point, so as to determine whether or not to form a vehicle group constituted by the first vehicle and the second vehicle or the first vehicle and the vehicle group.

3. A running control apparatus according to claim 1, wherein the vehicle group forming unit sets a permissible range for the target speed pattern of the first vehicle to the predetermined point and forms a vehicle group constituted by the first vehicle and the second vehicle or the first vehicle and the vehicle group, wherein the second vehicle and the vehicle group have a target speed pattern to the predetermined point falling within the permissible range of the first vehicle.

4. A running control apparatus according to claim 1, wherein the target speed pattern is constituted by a time required for each vehicle or vehicle group to run a given distance section.

5. A vehicle group forming system for forming a vehicle group with a plurality of vehicles, the system comprising:

an action plan generating unit for generating a target speed pattern according to a running mode required by a driver, the running mode being selected from a travel time preference mode and a traffic flow coordination preference mode;

a running control apparatus configured to form the vehicle group by comparing respective action target speed patterns of vehicles or vehicle groups to a predetermined point; and a determining unit that determines whether or not a specific demand for the vehicle can be satisfied even when the vehicle group is formed.

* * * * *